US008952848B2

(12) United States Patent
Benavides

(10) Patent No.: US 8,952,848 B2
(45) Date of Patent: Feb. 10, 2015

(54) SYSTEM AND METHOD FOR DETERMINING THE LOCATION OF THE PHASE CENTER OF AN ANTENNA

(75) Inventor: Armando Benavides, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 1115 days.

(21) Appl. No.: 12/255,273

(22) Filed: Oct. 21, 2008

(65) Prior Publication Data

US 2012/0182184 A1 Jul. 19, 2012

(51) Int. Cl.
*G01S 5/04* (2006.01)
*H01Q 3/26* (2006.01)

(52) U.S. Cl.
CPC .................................... *H01Q 3/267* (2013.01)
USPC .......................................................... 342/442

(58) Field of Classification Search
CPC ...................................................... H01Q 3/267
USPC .......................................................... 342/442
See application file for complete search history.

(56) References Cited

U.S. PATENT DOCUMENTS

| | | | | |
|---|---|---|---|---|
| 4,809,012 | A * | 2/1989 | Tong | 343/853 |
| 5,771,019 | A | 6/1998 | Wachs et al. | |
| 5,841,288 | A * | 11/1998 | Meaney et al. | 324/639 |
| 6,266,361 | B1 | 7/2001 | Huang et al. | |
| 6,448,788 | B1 * | 9/2002 | Meaney et al. | 324/637 |
| 6,771,217 | B1 | 8/2004 | Liu et al. | |
| 6,778,130 | B1 * | 8/2004 | Bevan et al. | 342/174 |
| 6,906,665 | B1 * | 6/2005 | Lam | 342/368 |

(Continued)

FOREIGN PATENT DOCUMENTS

| | | | | |
|---|---|---|---|---|
| SU | 1125559 A * | 11/1984 | | |
| SU | 1702325 A1 * | 12/1991 | | |
| WO | WO 2009077762 A2 * | 6/2009 | | G01V 1/38 |

OTHER PUBLICATIONS

Abello et al., "Phase Centre Location Determination for Locatalite Antenna n the LocataNet System", IGNSS, 2007.*

(Continued)

*Primary Examiner* — Frank J McGue
(74) *Attorney, Agent, or Firm* — Alston & Bird LLP

(57) ABSTRACT

A system and method for determining the location of the phase center of an antenna are provided. For the transverse location of the phase center, the system may include radio frequency (RF) probes symmetrically surrounding the antenna's geometrical center to define RF probe pairs, a plurality of phase detectors for determining a phase difference between the signals detected by each pair and a processor for determining the transverse location of the phase center based upon probe position and the phase differences. For the longitudinal location of the phase center, the system may include first and second RF probes having a common transverse position, but being longitudinally separated, a phase detector for determining a phase difference between the signals detected by the probes and a processor for determining the longitudinal location of the phase center based upon the longitudinal separation and the phase difference.

16 Claims, 4 Drawing Sheets

(56) References Cited

U.S. PATENT DOCUMENTS

| | | | | |
|---|---|---|---|---|
| 6,982,678 | B2 | 1/2006 | Obert et al. | |
| 7,298,325 | B2 | 11/2007 | Krikorian et al. | |
| 7,382,313 | B1 * | 6/2008 | Goad | 342/357.76 |
| 7,414,576 | B1 | 8/2008 | Liu | |
| 2007/0126629 | A1 | 6/2007 | Krikorian et al. | |
| 2009/0325598 | A1 * | 12/2009 | Guigne et al. | 455/456.1 |

OTHER PUBLICATIONS

Prata, "Misaligned Antenna Phase-Center Determination Using Measured Phase Patterns", IPN Progress Report 42-150, Aug. 15, 2002.*

Akrour et al. "Calibrating Antenna Phase Centers", GPS World, Feb. 1, 2005.*

* cited by examiner

SYSTEM AND METHOD FOR DETERMINING THE LOCATION OF THE PHASE CENTER OF AN ANTENNA

FIELD OF THE INVENTION

Embodiments of the present invention are generally directed to methods and systems for evaluating an antenna and, more particularly, to methods and systems for determining the location of the phase center of an antenna in the transverse and/or longitudinal directions.

BACKGROUND OF THE INVENTION

The phase center of an antenna is a reference point from which electromagnetic radiation appears to emanate, all radiated fields measured on a spherical surface whose center coincides with the antenna phase center have the same phase. When navigation satellites report their position to the user, they actually report the location of the phase center of the antenna of their navigation transponder. The accuracy with which a user position is determined may be improved by more precisely identifying the coordinates of this phase center. For example, in instances in which the phase center of the antenna of the navigation transponder onboard a Global Positioning System (GPS) satellite is accurately measured and reported to the users, the user range error (URE) may be reduced, thereby making subsequent position determinations more accurate since the URE is the key performance parameter (KPP) of the entire GPS system.

In order to determine the location of the phase center of an antenna, the location of the phase center is generally measured at an antenna range test prior to deployment of the antenna. The information regarding the location of the phase center that is garnered during an antenna range test may then form the starting point for measurements of the displacement of the phase center of the antenna following its deployment; knowing the initial location of the phase center and measuring its displacement, the new instantaneous location is easily determined. With respect to antennas to be carried by satellites, the location of the phase center of the antenna may be measured with respect to the center of gravity of the satellite, such as a GPS satellite, during antenna range tests on the ground prior to launch. The information regarding the location of the phase center of the antenna is then employed as a starting point in order to measure the instantaneous location of the phase center of the antenna onboard the satellite following launch and during orbit. These measurements generally utilize monitor stations positioned around the world. Once the location of the phase center of an antenna has been determined, it may then be reported to the recipients of signals from the antenna, such as the users of a GPS satellite. By having an accurate estimate of the location of the phase center of the antenna, the URE may be reduced such that user positions can be determined with more accuracy. However, since the satellites carrying the antennas may orbit at a relatively large distance from the center of the earth, such as a distance of about 26,000 kilometers in one instance, measurements of the location of the phase center of an antenna may have errors that are larger than desired, such as errors that may exceed 18 inches (45.7 centimeters) in some instances. In this regard, these measurements of the location of the phase center of an antenna rely upon transmission of the radio frequency (RF) signals through the earth's atmosphere. Since the earth's atmosphere is a thermally unstable dispersive media causing variable delays to RF signals, the electromagnetic energy emitted by the antenna and, in turn, the RF signals received by the monitor stations on the ground may be altered by the atmosphere, thereby resulting in inaccuracies in the determination of the location of the phase center. As such, the information regarding the location of the phase center of the antenna that is provided to the recipients of signals from the antenna may differ from the actual location of the phase center of the antenna measured using the monitor stations. Moreover, the in orbit measurement process may take more time than is desired.

Additionally, the location of the phase center of an antenna will generally vary with changes in temperature and pressure due to, for example, thermal deformations of reflectors, feeds and/or antenna elements. As such, even if the location of the phase center of an antenna is accurately estimated at one point, this location may change as the pressure and temperature changes such that the location of the phase center of the antenna must be repeatedly determined.

In order to provide improved performance for at least some antenna-based systems, such as improved location determination for navigation systems, it may be desirable to provide an improved technique for determining location displacement of the phase center of an antenna. By more accurately determining the location of the phase center of an antenna, the recipient of signals from the antenna (the user) could also receive more accurate information regarding the location of the phase center of the antenna in order to reduce the errors that may otherwise exist in the determination of the user position.

BRIEF SUMMARY OF THE INVENTION

Various embodiments of the present invention are therefore provided for determining the location of the phase center of an antenna, such as the transverse location of the phase center of the antenna and/or the longitudinal location of the phase center of the antenna. In this regard, embodiments of a system and method of the present invention permit the location of the phase center of the antenna to be determined more accurately following deployment of the antenna by avoiding perturbations that may otherwise be introduced by the earth's atmosphere through which the RF signals emitted by the antenna must travel. By more precisely determining the phase center location of the antenna, the recipients of the signals from the antenna obtain a more precise determination of their position.

In accordance with one aspect of the present invention, a system for determining the transverse location of the phase center of an antenna is provided. In this regard, the system of one embodiment is configured to determine the transverse location of the phase center of an antenna and includes a plurality of radio frequency (RF) probes located at respective predefined positions surrounding the geometrical center of the antenna. The RF probes may be positioned symmetrically about the geometrical center of the antenna to thereby define a plurality of RF probe pairs with each RF probe pair including a pair of diametrically opposed RF probes. The system of this embodiment may also include a plurality of phase detectors configured to determine a phase difference between the RF signals detected by the RF probes of respective RF probe pairs. Further, the system of this embodiment may include a processor configured to determine the transverse location of the phase center of the antenna based upon the predefined position of each RF probe and the phase differences associated with the plurality of RF probe pairs. For example, the processor may be configured to determine the transverse displacement of the phase center relative to the geometrical center of the antenna and compute the new transverse location of the phase center. The processor may make such determinations and computations instantaneously or nearly instantaneously in some embodiments.

In another embodiment, the system is configured to determine the longitudinal location of the phase center of an antenna and includes first and second RF probes having a common transverse position with respect to the geometrical center of the antenna, but being longitudinally separated from one another. The system of this embodiment may also include a phase detector configured to determine a phase difference between the RF signals detected by the first and second RF probes. Further, the system of this embodiment may include a processor configured to determine the longitudinal phase center location of the antenna based upon a longitudinal separation between the first and second RF probes and a phase difference between the RF signals detected by the first and second RF probes.

The antenna of one embodiment may be carried by a space vehicle with the processor being configured to provide the phase center location, such as the instantaneous phase center location, of the antenna for transmission onboard the space vehicle. For example, the antenna may be a global positioning system (GPS) antenna. In this regard, the RF probes employed to determine the transverse phase center displacement may include a plurality of integrated transfer systems (ITS) antenna elements of the GPS antenna, while the first and second RF probes employed to determine the longitudinal phase center displacement may include the tracking, telemetry and command the (TT&C) antenna elements of the GPS antenna.

In one embodiment, the RF probes are configured to detect RF signals at each of the downlink frequencies. As such, the processor of this embodiment may be configured to separately determine the location of the phase center of the antenna (the transverse coordinates of the phase center and/or the longitudinal coordinate of the phase center) for each of the downlink frequencies. With respect to the transverse phase center location, the processor may base this determination upon the predefined position of each RF probe and the phase differences associated with the plurality of RF probe pairs at each of the downlink frequencies. With respect to the longitudinal phase center location, the processor may base this determination upon the longitudinal separation between the first and second RF probes and the phase difference between the RF signals detected by the first and second RF probes at each of the downlink frequencies. In order to facilitate this separate determination of the location of the phase center of the antenna at each of the downlink frequencies, the system may also include a band pass filter configured to selectively pass the RF signals having a respective one of the downlink frequencies.

In accordance with another aspect of the present invention, a method for determining the location of the phase center of an antenna is provided. In this regard, the method of one embodiment determines the transverse phase center location of the antenna by detecting RF signals with a plurality of RF probes located at respective predefined positions surrounding the geometrical center of the antenna. The RF probes may be positioned symmetrically about the geometrical center of the antenna to thereby define a plurality of RF probe pairs with each RF probe pair including a pair of diametrically opposed RF probes. The method of this embodiment may also determine a phase difference between the RF signals detected by the RF probes of respective RF probe pairs and then determine the transverse phase center location of the antenna based upon the predefined position of each RF probe and the phase differences associated with the plurality of RF probe pairs. For example, the method may determine the transverse coordinates of the phase center location relative to the geometrical center of the antenna.

In another embodiment, a method for determining the longitudinal phase center location is provided in which RF signals are detected with first and second RF probes having a common transverse position with respect to the geometrical center of the antenna, but being longitudinally separated from one another. The method of this embodiment also determines a phase difference between the RF signals detected by the first and second RF probes and then determines the longitudinal phase center location of the antenna based upon a longitudinal separation between the first and second RF probes and a phase difference between the RF signals detected by the first and second probes.

The antenna of one embodiment may be carried by a space vehicle with the method being configured to provide the location of the phase center of the antenna for transmission offboard the space vehicle. For example, the antenna may be a global positioning system (GPS) antenna. In this regard, the RF probes employed to determine the transverse location of the phase center may include a plurality of integrated transfer systems (ITS) antenna elements of the GPS antenna, while the first and second RF probes employed to determine the longitudinal location of the phase center may include the tracking, telemetry and command the (TT&C) antenna elements of the GPS antenna.

In one embodiment of the method, the detection of RF signals with the RF probes includes separately detecting RF signals at each of the downlink frequencies. In this regard, this determination of the location of the phase center of the antenna (transverse coordinates of the phase center and/or the longitudinal coordinate of the phase center) is performed separately for each of the downlink frequencies. With respect to the transverse location of the phase center, this determination may be based upon the predefined position of each RF probe and the phase differences associated with the plurality of RF probe pairs at each of the downlink frequencies. With respect to the longitudinal location of the phase center, this determination may be based upon the longitudinal separation between the first and second RF probes and the phase difference between the RF signals detected by the first and second RF probes at each of the downlink frequencies. In order to facilitate this separate determination (transverse and longitudinal) of the location of the phase center of the antenna at each of the downlink frequencies, the method may also selectively pass the RF signals having a respective one of the downlink frequencies.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
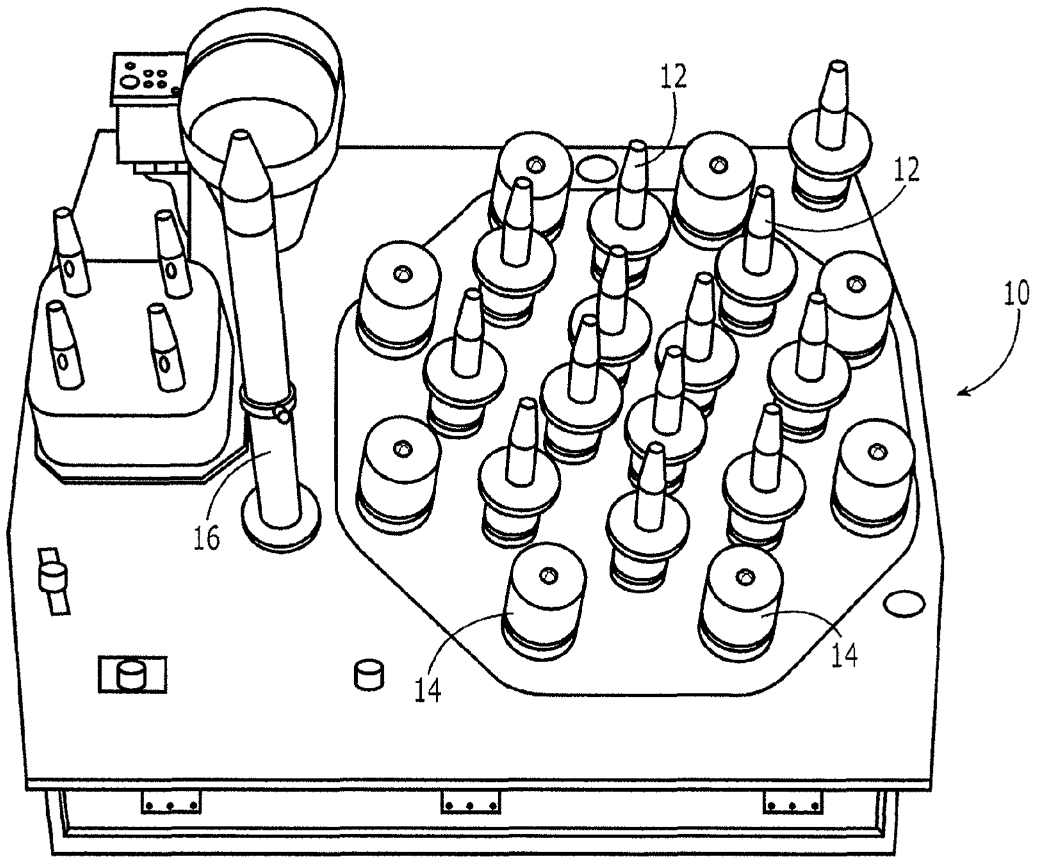
FIG. 1 is a perspective view of a GPS antenna.
Figure 4:
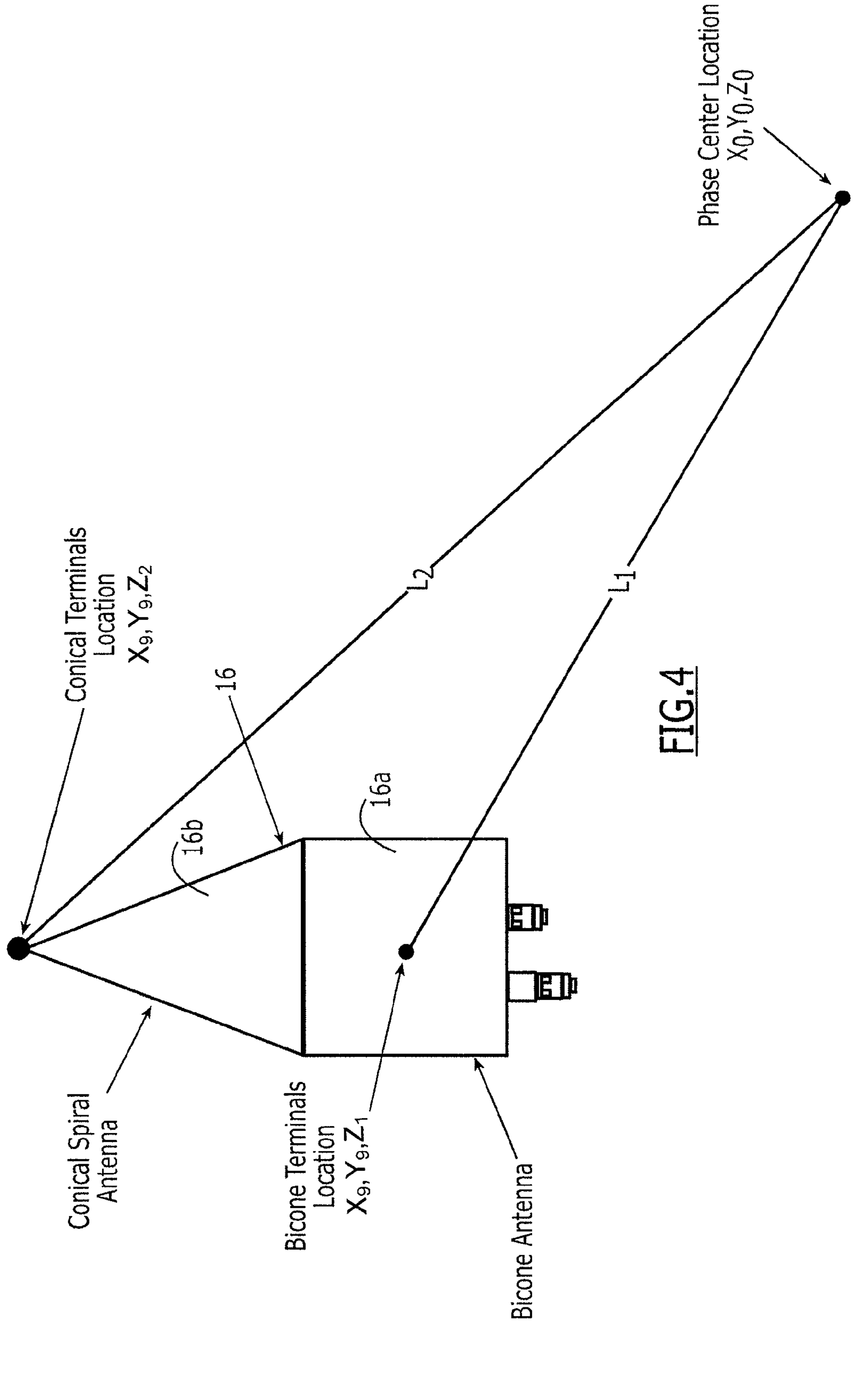
FIG. 4 is a schematic representation of a conical spiral antenna element of a GPS antenna.

Referring now to FIG. 1, a Global Positioning System (GPS) antenna 10 is depicted. The GPS antenna includes a plurality of L-band antenna elements 12 disposed in a central or interior portion of the antenna for transmitting and receiving signals having frequencies in the L-band. The GPS antenna also includes a plurality of integrated transfer systems (ITS) antenna elements 14 that are generally positioned about the L-band elements. The ITS antenna elements may be used for crosslink purposes, such as to permit communications between two or more antennas, such as the antennas onboard two or more space vehicles, e.g., satellites. Typically the ITS antenna elements support communication in a different frequency band than the L-band antenna elements, such as in the ultra high frequency (UHF) band. As described below and as shown in FIG. 4, the GPS antenna can also include a TT&C antenna element 16 having a generally cylindrical bicone antenna 16*a* and a conical spiral antenna 16*b* positioned upon the bicone antenna. While the ITS antenna elements are typically positioned symmetrically about the L-band antenna elements, the TT&C antenna element is generally positioned in a non-symmetrical arrangement and, in the illustrated embodiment, is positioned alongside the L-band antenna elements.

While embodiments of the present invention will be described in conjunction with a GPS antenna 10 utilized for navigation purposes, the system and method of embodiments of the present invention can be employed in conjunction with a wide variety of other types of antennas, be it for navigation purposes, communication purposes or otherwise. Additionally, the system and method of embodiments of the present invention can be employed in conjunction with a single antenna as well as an array of antennas, such as the plurality of L-band antenna elements 12 depicted in FIG. 1. As used herein, both a single antenna and an array of antennas will be referenced as an "antenna".

An antenna, such as the GPS antenna 10 depicted in FIG. 1, has a geometrical center based upon the physical arrangement of the antenna elements. An antenna, such as the GPS antenna depicted in FIG. 1, also has a phase center which, in turn, has both, transverse and longitudinal coordinates of its location. In order to permit the GPS or other navigation antenna to determine a user position in a precise manner, it is desirable to determine the location of the phase center of an antenna.

In order to avoid inaccuracies that arise resulting from atmosphere instabilities that are otherwise inherent in the measurement of the location of the phase center of an antenna from the ground following the launch of a space vehicle, such as a satellite, that carries the antenna, the system and method of embodiments of the present invention make use of radio frequency (RF) probes that are also incorporated into the antenna to obtain local measurements that have not been perturbed by atmospheric conditions or the like. Indeed, in one embodiment, the existing antenna elements are employed to obtain the measurements necessary to determine the location of the phase center of the antenna. As such, the system of one embodiment of the present invention may include a plurality of radio frequency (RF) probes located at respective predefined positions relative to the geometrical center of the antenna. In this regard, the ITS antenna elements 14 may serve as the RF probes. As shown in FIG. 1 and, in more detail, in FIG. 2 in which $P_1$, $P_2$ . . . $P_8$ represent eight RF probes, the ITS antenna elements are positioned in a symmetrical arrangement relative to the geometrical center of the antenna 10. Although the symmetrical arrangement of the RF probes, e.g., the ITS antenna elements, may simplify some of the underlying equations via which the location of the phase center is determined, the RF probes may be disposed in other arrangements, such as non-symmetrical arrangements, relative to the geometrical center of the antenna, if so desired. In addition, although the illustrated embodiment includes eight RF probes, the system may include three or any larger number of RF probes.

The system of one embodiment of the present invention determines the location of the phase center of the antenna for at least one frequency of interest, and, in one embodiment, at each of a plurality of frequencies of interest. For example, the antenna may be configured to transmit signals at several downlink frequencies. As such, the system of one embodiment may be configured to separately determine the location of the phase center of the antenna at each of the downlink frequencies.

In operation, the system and method of one embodiment may determine the location of the phase center of the antenna, such as the transverse location of the phase center and/or the longitudinal location of the phase center. In order to determine the transverse location of the phase center, the system of this embodiment includes a plurality of RF probes positioned in a symmetrical arrangement about the geometrical center of the antenna, such as the ITS antenna elements 14 shown in FIG. 2. As such, the plurality of RF probes defines a plurality of RF probe pairs with each RF probe pair including a pair of diametrically opposed RF probes. In regards to the example depicted in FIG. 2, $P_1$ and $P_5$ define a first RF probe pair, $P_2$ and $P_6$ define a second RF probe pair, and $P_3$ and $P_7$ define a third RF probe pair and $P_4$ and $P_8$ define a fourth RF probe pair.

Figure 3:
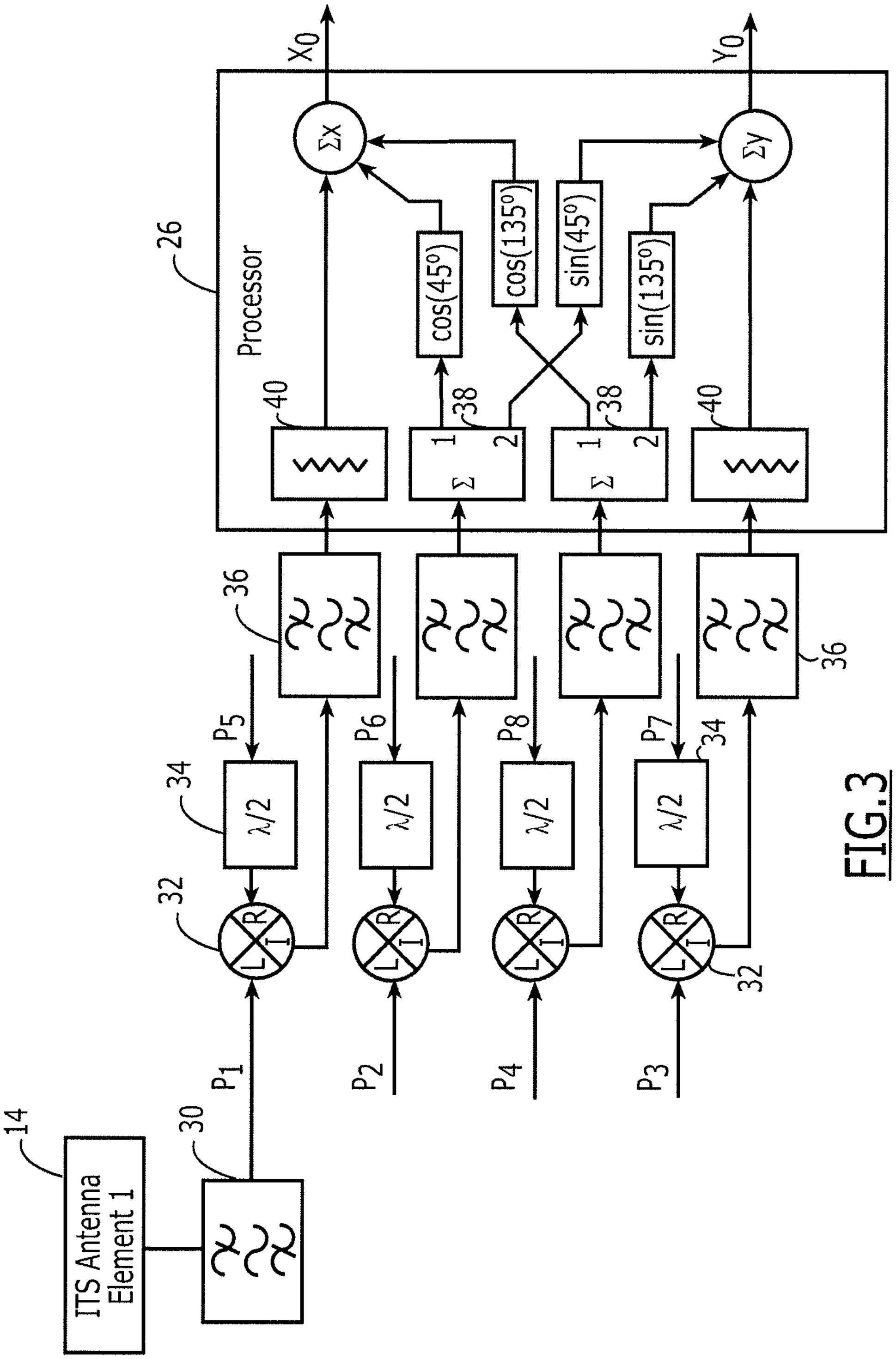
FIG. 3 is a block diagram of a system for determining the location of the phase center of an antenna in accordance with another embodiment to the present invention.

As described above, the antenna, such as the L-band antenna elements 12, transmits an RF signal having a predefined frequency, such as a particular downlink frequency. The RF probes receive the RF signals and provide the RF signals to a respective detector. In this regard, the system may include a plurality of phase detectors, one of which is associated with each RF probe pair. As shown in FIG. 3, for example, the RF signals received by an RF probe 14 may be provided to a band pass filter 30 configured to selectively pass the signals of a predefined frequency band, such as the L-band, while selectively rejecting RF signals having other frequencies. In this regard, although FIG. 3 only depicts $P_1$ and its associated band pass filter, the system of this embodiment would also include $P_2$, . . . $P_8$ and their associated band pass filters. Thereafter, the RF signals received by the RF probes of an RF probe pair and passed by the respective pass band filters are provided to a respective phase detector 32 to determine the phase difference between the RF signals. In one embodiment, in order to determine the difference between the phases of the RF signals received by the RF probes of an RF probe pair, a phase shift of t radians (180 degrees) is introduced between the RF signals from the RF probes of an RF probe pair such by means of a phase shifter, such as a transmission line having an electrical length of half a wavelength 34. As such, the phase detector determines the difference in the phases of the RF signals received by the RF probes of the respective RF probe pair. Typically, although the phase of the RF signals is expressed in radians, the phase difference that is output by the phase detector is generally expressed in volts since the transfer function of the phase detector is generally expressed in units of volts/radian.

After removing the carrier wave, such as by passing the output of each phase detector 32 through a respective low pass filter 36, the system may include a processor 26 configured to determine the x and y coordinates of the phase center relative to the geometrical center of the antenna. The processor may be embodied in a number of different ways. For example, the processor may be embodied as various processing means such as a processing element, a coprocessor, a controller or various other processing devices including integrated circuits such as, for example, an ASIC (application specific integrated circuit). With respect to the arrangement of the RF probes depicted in FIG. 2 in which the x axis is extends through $P_1$ and $P_5$ and the y axis extends through $P_3$ and $P_7$ with $P_2$, $P_4$, $P_6$ and $P_8$ positioned at 45° from each of the x and y axis, the processor may combine the respective phase differences in the manner depicted in FIG. 3. In this regard, those phase differences attributable to the RF probes that lie on a respective axis contribute directly and solely to the transverse component of the location of the phase center along the respective axis. In this regard, the phase difference between $P_1$ and $P_5$ contributes only to the x component of the location of the phase center, while the phase difference between $P_3$ and $P_7$ contributes only to the y component of the location of the phase center. However, the phase differences for RF signals received by RF probes that are offset from both the x and y axes are separated by the processor into their respective x and y components, such as by multiplying the phase difference by the cosine and sine of the probe's angular offset from the positive x axis in order to produce their contribution to the x and y components of the transverse location of the phase center, respectively. By summing the x and y components attributable to the phase differences of each RF probe pair, the processor can determine the transverse location of the phase center $(x_0,y_0)$ as an offset from the geometrical center of the antenna.

Figure 2:
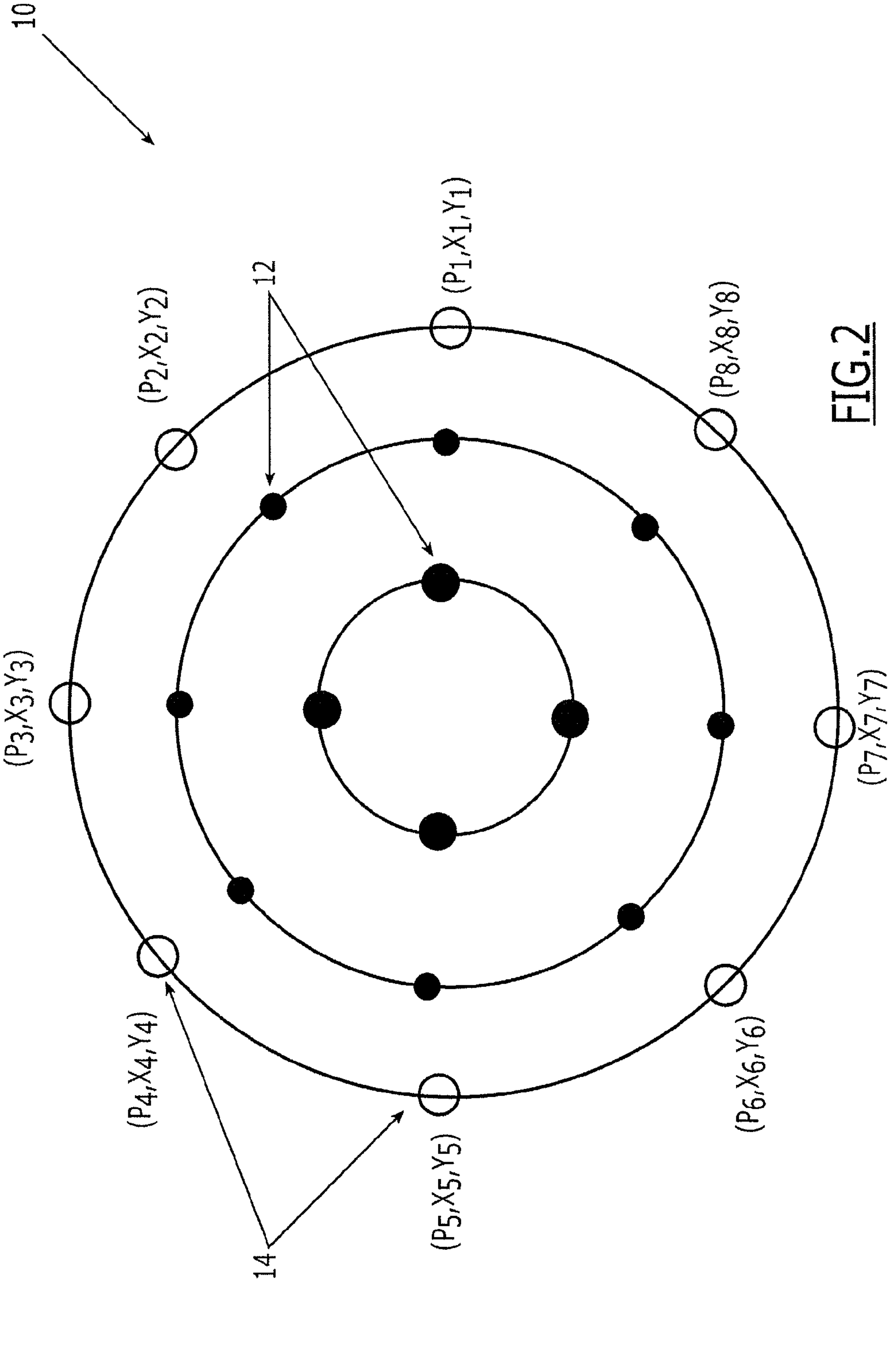
FIG. 2 is a schematic representation of the integrated transfer system (ITS) antenna elements and the L-band antenna elements of a GPS antenna.

In the embodiment of FIGS. 2 and 3, the processor 26 may therefore determine the transverse displacement of the phase center of the antenna 10 as follows:

$$\Delta x_0 = \left(\frac{c}{\omega}\right)[(\theta_1-\theta_5)+(\theta_2-\theta_6)\cos(45\,deg)+(\theta_4-\theta_8)\cos(135\,deg)]$$

$$\Delta y_0 = \left(\frac{c}{\omega}\right)[(\theta_3-\theta_7)+(\theta_2-\theta_6)\sin(45\,deg)+(\theta_4-\theta_8)\sin(135\,deg)]$$

wherein $\Delta x_0$ and $\Delta y_0$ are the x and y transverse displacement offsets of the phase center from the geometrical center of the antenna, $\theta_i$ is the phase of the i-th probe and c is the speed of light and ω is the angular frequency of interest, e.g., 2πf wherein f is a respective one of the downlink frequencies or other frequency of interest, such that the expression c/ω converts phase differences in radians to units of distance, such as meters.

In regard to the embodiment of FIG. 3, it is noted that the phase difference signal associated with each RF probe pair that does not lie on the x or y axis is split, such as by splitter 38. In one embodiment, the splitter divides the power of each resulting signal in half. In order to maintain consistency between the amplitudes of the outputs from each phase detector 32, the system of the embodiment of FIG. 4 may also include attenuators 40 for similarly reducing the power by half for signals from RF probe pairs that lie on the x and y axes.

In addition to or instead of determining the transverse location of the phase center, the system and method of embodiments of the present invention may determine the longitudinal location of the phase center of the antenna 10. In this embodiment, the system employs first and second RF probes that have common transverse coordinates, that is, a common position in the x, y plane with the respect to the geometrical center of the antenna, but that are longitudinally separated from one another, that is, the first and second RF probes are at different locations in the z plane. As shown in FIGS. 1 and 4, for example, the tracking, telemetry and command (TT&C) antenna element 16 of the GPS antenna 10 may serve as the first and second RF probes. Relative to the geometrical center of the antenna, the bicone antenna 16*a* may serve as the first RF probe (positioned at $((x_9, y_9, z_1))$, while the conical spiral antenna 16*b* may serve as the second RF probe (positioned at $(x_9, y_9, z_2)$).

As described above in conjunction with the system of the embodiment of FIG. 3, the antenna, such as the L-band antenna elements 12 of the GPS antenna 10 of FIG. 1, may transmit signals having a predefined frequency, such as an L-band frequency. The first and second RF probes, such as the bicone antenna 16*a* and the conical spiral antenna 16*b* element of the TT&C antenna 16, may receive the RF signals. Once the RF signals have been filtered, such as by having passed through the band pass filter 30, and a phase offset of 180° has been imposed between the RF signals received by the first and second RF probes, such as by means of phase shifter 34, such as a trasnmision line having an electrical length of half a wavelength, the RF signals from the first and second RF probes may be provided to a phase detector 32 to determine the phase difference therebetween. After filtering out the carrier wave, such as by means of the low pass filter 36, the resulting phase difference may be provided to the processor 26 in order to determine the longitudinal displacement of phase center of the antenna, that is, the displacement of the longitudinal location of the phase center from the geometrical center of the antenna. In this regard, the processor can determine the longitudinal displacement of the phase center $\Delta z_0$ in accordance with the following equations:

$$dz_0 = \frac{c}{\omega}\cdot\left[\frac{d\theta}{\dfrac{z_0-z_2}{\sqrt{(x_9-x_0)^2+(y_9-y_0)^2+(z_2-z_0)^2}}-\dfrac{z_0-z_1}{\sqrt{(x_9-x_0)^2+(y_9-y_0)^2+(z_1-z_0)^2}}}\right]$$

$$dz_0 = \frac{c}{\omega}\cdot\left[\frac{\sqrt{(x_9-x_0)^2+(y_9-y_0)^2+(z_1-z_0)^2}\cdot\sqrt{(x_9-x_0)^2+(y_9-y_0)^2+(z_2-z_0)^2}}{(z_0-z_2)\cdot\left[\sqrt{(x_9-x_0)^2+(y_9-y_0)^2+(z_1-z_0)^2}\right]-(z_0-z_1)\cdot\left[\sqrt{(x_9-x_0)^2+(y_9-y_0)^2+(z_2-z_0)^2}\right]}\right]\cdot d\theta$$

$$dz_0 = \frac{c}{\omega}\cdot\left[\frac{L_1\cdot L_2}{(z_0-z_2)\cdot L_1-(z_0-z_1)\cdot L_2}\right]\cdot d\theta$$

In instances in which the distance $L_1$ from the phase center to the bicone antenna is approximately equal to the distance $L_2$ from the phase center to the conical spiral antenna such that both $L_1$ and $L_2$ can be approximated as L, the processor 26 can then further determine the longitudinal displacement of the phase center of the antenna as follows:

$$dz_0 = \frac{c}{\omega}\cdot\left(\frac{L}{z_1 - z_2}\right)\cdot d\theta$$

$$\frac{d}{d\theta}z_0 = \frac{c}{\omega}\cdot\left(\frac{L}{z_1 - z_2}\right)$$

$$\Delta z_0 = \frac{c}{\omega}\cdot\left(\frac{L}{z_1 - z_2}\right)\cdot\Delta\theta$$

wherein c is the speed of light and ω is the angular frequency of interest such that the expression c/ω converts phase changes in radians to units of longitudinal displacement of the phase center such as meters.

By determining the location of the phase center of the antenna 10, including in one embodiment the transverse location of the phase center and the longitudinal location of the phase center, the antenna can report the location of its phase center to users in communication with the antenna. In embodiments in which the antenna is carried by a GPS satellite, the location of the phase center of the antenna may be provided to the users which, in turn, can take this phase center location into account in order to reduce their URE which, as noted above, is the key performance parameter (KPP) of a GPS system. Since the location of the phase center of an antenna may also vary with changes in the temperature and pressure to which the antenna is subjected, the system and method of embodiments of the present invention may repeatedly determine the location of the phase center of the antenna and then report the location of the phase center of the antenna, to include both, the transverse location of the phase center and the longitudinal location of the phase center, to the users in order to permit more accurate determinations of their locations by reducing their URE.

While the system and method of one embodiment has been described in conjunction with determining the location of the phase center of an antenna for RF signals having a respective frequency, the system and method may separately determine the transverse and/or longitudinal coordinates of the location of the phase center of the antenna, for RF signals having each of a number of different frequencies, such as each of several downlink frequencies. For example, a GPS satellite may broadcast four L-band signals at four different frequencies. As such, the system and method of embodiments of the present invention may determine the location of the phase center for any or all of these frequencies, referenced generally as downlink frequencies herein. In this regard, the system of this embodiment may include a plurality of band pass filters 30 (depicted in FIG. 3 as a single element) associated with each respective RF probe, such that a first band pass filter may selectively pass the RF signals at the first downlink frequency while the rejecting signals having other frequencies, and a second band pass filter may selectively pass the RF signals at the second downlink frequency while rejecting the signals having other frequencies and repeat this process with each of the remaining downlink frequencies.

Other embodiments of the system and method of finding the transverse location of the phase center of an antenna may be used in conjunction with an uplink signal. In this regard, an antenna, such as the communication antennas (non-GPS applications) on board satellites, may be configured to determine the angle of arrival (AOA) of the uplink, e.g., communication, signal in the same manner as described above utilizing, for example, a band pass filter 30 having a pass band centered or otherwise including the frequency of the uplink signals. This AOA information can be used as an aid for antenna pointing. Also by using embodiments of this system, three or more satellites can pin-point the location of a jammer which can be useful in a tactical theatre during wartime operations Many modifications and other embodiments of the invention will come to mind to one skilled in the art to which this invention pertains having the benefit of the teachings presented in the foregoing descriptions and the associated drawings. Therefore, it is to be understood that the inventions is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for determining a transverse location of the phase center of an antenna carried by a space vehicle comprising:

the antenna comprising at least one antenna element and a plurality of radio frequency (RF) probes positioned about the at least one antenna element and surrounding a geometrical center of the antenna, each antenna element and RF probe being located at a predefined position and being carried with the antenna by a common platform, the plurality of RF probes positioned symmetrically about the geometrical center of the antenna to thereby define a plurality of RF probe pairs with each RF probe pair including a pair of diametrically opposed RF probes;

a plurality of phase detectors configured to determine a phase difference between the RF signals transmitted by the at least one antenna element of the antenna and detected by the RF probes of respective RF probe pairs based on local measurements obtained following launch of the space vehicle that are unperturbed by atmospheric conditions; and a processor configured to determine the transverse location of the phase center of the antenna based upon the predefined position of each RF probe and the phase differences associated with the plurality of RF probe pairs, wherein the processor is also configured to determine the transverse location of the phase center of the antenna and provide the transverse location of the phase center of the antenna for transmission offboard the space vehicle following launch of the space vehicle.

2. A system according to claim 1 wherein the antenna comprises a global positioning system (GPS) antenna, and wherein the RF probes comprise a plurality of Integrated Transfer System (ITS) antenna elements of the GPS antenna.

3. A system according to claim 1 wherein the processor is further configured to determine the transverse location of the phase center relative to the geometrical center of the antenna.

4. A system according to claim 1 wherein the RF probes are configured to detect RF signals at each of a plurality of downlink frequencies, and wherein the processor is configured to separately determine the transverse location of the phase center of the antenna for each of the downlink frequencies based upon the predefined position of each RF probe and the phase differences associated with the plurality of RF probe pairs at each of the downlink frequencies.

5. A system according to claim 4 further comprising a band pass filter configured to selectively pass the RF signals at a respective one of several downlink frequencies.

6. A method for determining a transverse location of the phase center of an antenna carried by a space vehicle that comprises at least one antenna element and a plurality of radio frequency (RF) probes positioned about the at least one antenna element, the method comprising:

following launch of the space vehicle, detecting RF signals with the plurality of RF probes surrounding a geometrical center of the antenna, each antenna element and RF probe being located at a predefined position and being carried with the antenna by a common platform, the plurality of RF probes positioned symmetrically about the geometrical center of the antenna to thereby define a plurality of RF probe pairs with each RF probe pair including a pair of diametrically opposed RF probes;

determining a phase difference between the RF signals transmitted by the at least one antenna element of the antenna and detected by the RF probes of respective RF probe pairs based on local measurements obtained following launch of the space vehicle that are unperturbed by atmospheric conditions;

determining the transverse location of the phase center of the antenna based upon the predefined position of each RF probe and the phase differences associated with the plurality of RF probe pairs; and transmitting the transverse location of the phase center of the antenna offboard the space vehicle following launch of the space vehicle.

7. A method according to claim 6 wherein the antenna comprises a global positioning system (GPS) antenna, and wherein the RF probes comprise a plurality of Integrated Transfer System (ITS) antenna elements of the GPS antenna.

8. A method according to claim 6 wherein determining the transverse location of the phase center comprises determining the transverse location of the phase center relative to the geometrical center of the antenna.

9. A method according to claim 6 wherein detecting RF signals with the RF probes comprises separately detecting RF signals at each of a plurality of downlink frequencies, and wherein determining the transverse location of the phase center comprises separately determining the transverse location of the phase center of the antenna for each of the downlink frequencies based upon the predefined position of each RF probe and the phase differences associated with the plurality of RF probe pairs at each of the downlink frequencies.

10. A method according to claim 9 selectively passing the RF signals at a respective one of several downlink frequencies.

11. A system for determining a longitudinal location of the phase center of an antenna carried by a space vehicle, the system comprising:

the antenna comprising at least one antenna element and first and second radio frequency (RF) probes having a common transverse position with respect to a geometrical center of the antenna, but being longitudinally separated from one another, wherein the at least one antenna element and the first and second RF probes of the antenna are carried by a common platform;

a phase detector configured to determine a phase difference between the RF signals transmitted by the at least one antenna element of the antenna and detected by the first and second RF probes based on local measurements obtained following launch of the space vehicle that are unperturbed by atmospheric conditions; and a processor configured to determine the longitudinal location of the phase center of the antenna based upon a longitudinal separation between the first and second RF probes and a phase difference between the RF signals detected by the first and second RF probes, wherein the processor is also configured to determine the transverse location of the phase center of the antenna and provide the longitudinal location of phase center of the antenna for transmission offboard the space vehicle following launch of the space vehicle.

12. A system according to claim 11 wherein the antenna comprises a global positioning system (GPS) antenna, and wherein the first and second RF probes comprise tracking, telemetry and command (TT&C) antenna elements of the GPS antenna.

13. A system according to claim 11 wherein the first and second RF probes are configured to detect RF signals at each of several downlink frequencies, and wherein the processor is configured to separately determine the longitudinal location of the phase center of the antenna for each of the downlink frequencies based upon the longitudinal separation between the first and second RF probes and the phase difference between the RF signals detected by the first and second RF probes at each of the downlink frequencies.

14. A method for determining a longitudinal location of the phase center of an antenna carried by a space vehicle that comprises at least one antenna element and first and second radio frequency (RF) probes positioned about the at least one antenna element, the method comprising:

following launch of the space vehicle, detecting RF signals with the first and second RF probes having a common transverse position with respect to a geometrical center of the antenna, but being longitudinally separated from one another, wherein the at least one antenna element and the first and second RF probes of the antenna are carried by a common platform;

determining a phase difference between the RF signals transmitted by the at least one antenna element of the antenna and detected by the first and second RF probes based on local measurements obtained following launch of the space vehicle that are unperturbed by atmospheric conditions;

determining the longitudinal location of the phase center of the antenna based upon a longitudinal separation between the first and second RF probes and a phase difference between the RF signals detected by the first and second RF probes; and transmitting the longitudinal location of the phase center of the space vehicle offboard the satellite following launch of the space vehicle.

15. A method according to claim 14 wherein the antenna comprises a global positioning system (GPS) antenna, and wherein the first and second RF probes comprise tracking, telemetry and command (TT&C) antenna elements of the GPS antenna.

16. A method according to claim 14 wherein detecting RF signals with the first and second RF probes comprises separately detecting RF signals at each of several downlink frequencies, and wherein determining the longitudinal location of the phase center comprises separately determining the longitudinal location of the phase center of the antenna for each of the downlink frequencies based upon the longitudinal separation between the first and second RF probes and the phase difference between the RF signals detected by the first and second RF probes at each of the downlink frequencies.

* * * * *